United States Patent [19]
Usdan

[11] 3,832,043
[45] Aug. 27, 1974

[54] SPECTACLES POSITIONING APPARATUS

[76] Inventor: Michael D. Usdan, 3771 N. Swan Ridge Cir., Memphis, Tenn. 38122

[22] Filed: Apr. 26, 1973

[21] Appl. No.: 354,647

[52] U.S. Cl. ............................... 351/123, 351/155
[51] Int. Cl. ............................................ G02c 5/14
[58] Field of Search.................... 351/123, 155, 156

[56] References Cited
UNITED STATES PATENTS

| | | | |
|---|---|---|---|
| 508,457 | 11/1893 | Wickliffe | 351/123 |
| 3,503,676 | 3/1970 | O'Neill | 351/123 |

*Primary Examiner*—Paul A. Sacher

[57] ABSTRACT

Apparatus for positioning standard spectacles so that no portion of the spectacles contacts the nose or adjoining facial tissue of the person wearing the spectacles. A pair of support pads formed of flexible, resilient plastic are positioned adjacent the malar-bones of the person wearing the spectacles and are mounted to each of the hinge members of the spectacles thereby holding the frame front of the spectacles away from the nose and adjoining facial tissue of the person wearing the spectacles.

1 Claim, 3 Drawing Figures

PATENTED AUG27 1974 3,832,043

SPECTACLES POSITIONING APPARATUS

BACKGROUND OF THE INVENTION

1. Field of the Invention

This invention relates to apparatuses for positioning spectacles so that no portion of the spectacles comes into contact with the nose and adjoining facial tissue of the person wearing the spectacles. More specifically, this invention relates to such apparatuses for use by persons who wear some form of prescription spectacles and undergo some form of nasal surgery or suffer from some sort of facial injury and as a result are unable to wear their normal spectacles until sufficient healing takes place.

2. Description of the Prior Art

Many special forms of spectacles have been devised that prevent the spectacles from contacting the nose and adjoining facial tissue of the person wearing the spectacles. The following U.S. Pats. disclose such spectacles: Wirth, No. 1,118,719; Comer, No. 1,238,496; Briggs, No. 1,647,124; and Hanke, No. 2,999,426. One major disadvantage in all these spectacles is the expense required for a specialized frame.

Numerous methods have been devised to adapt standard spectacles so that no portion of the spectacles contacts the nose and adjoining facial tissue of the person wearing the spectacles. One common practice is to wrap adhesive tape or the like around the bridge of the spectacles and to tape the spectacles to the forehead of the person wearing the spectacles. Another practice is to affix pads to the bottom rim of each lens of the spectacles. Also, a headband is sometimes attached to the nosepiece of the spectacles.

SUMMARY OF THE INVENTION

The present invention is directed towards overcoming the problems and disadvantages in previous apparatuses for positioning spectacles so that no portion of the spectacles contacts the nose and adjoining facial tissue of the wearer of the spectacles. The concept of the present invention is to provide an apparatus for use with standard spectacles that does not contact any part of the nose and adjoining facial tissue of the person wearing the spectacles, that does not permanently damage the spectacles, that is comfortable to the wearer of the spectacles, and that is not expensive.

The spectacles positioning apparatus of the present invention includes a pair of mounting means which are attached to the hinge members of the spectacles. A downwardly directed arm member is attached to each mounting means. Flexible, resilient support pads are attached to the ends of each arm member for contacting the wearer of the spectacles adjacent his malar bones thereby holding the frame front of the spectacles away from the nose and adjoining facial tissue of the wearer of the spectacles.

DESCRIPTION OF THE PREFERRED EMBODIMENT

Figure 1:
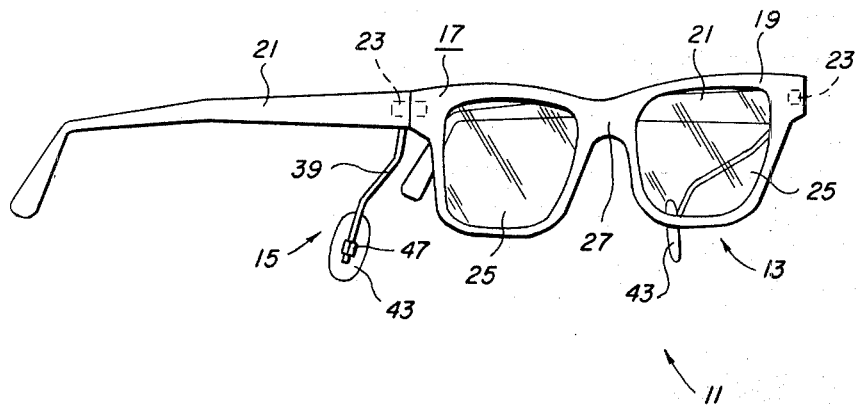
FIG. 1 is a pictorial view of the spectacles positioning apparatus of the present invention in combination with a standard pair of spectacles.
Figure 2:
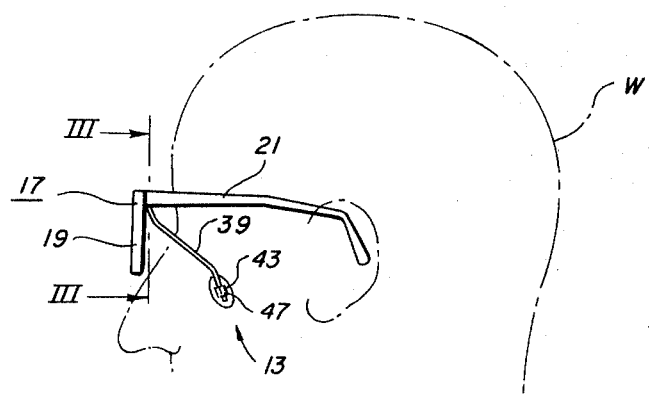
FIG. 2 is a side view of the present invention in combination with a standard pair of spectacles showing in phantom lines the person wearing the spectacles.

The spectacles positioning apparatus 11 of the present invention includes a first positioning member 13 and a second positioning member 15. The spectacles positioning apparatus 11 is for use with a standard pair of prescription spectacles 17 or the like including a frame front 19, a pair of temples 21 and a pair of hinge members 23 pivotally connecting the frame front 19 to the temples 21. The frame 19 includes a pair of lenses 25 and a bridge 27 connecting the pair of lenses 25. The first and second positioning members 13, 15 are identical in structure and are positioned one on each hinge member 23. Describing the structure of the first positioning member 13 should suffice for both.

Figure 3:
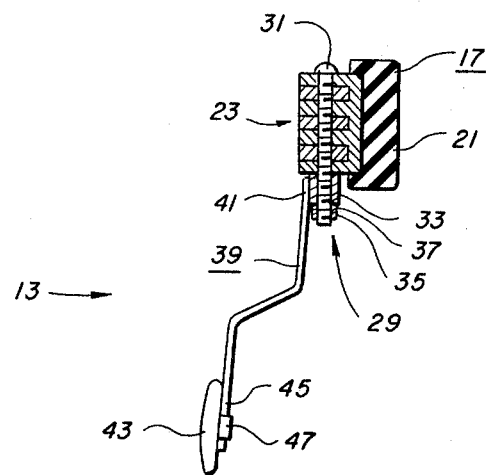
FIG. 3 is a sectional view of a portion of the present invention in combination with a standard pair of spectacles as taken on line III—III of FIG. 2.

The first positioning member 13 is mounted on one hinge member 23 by a mounting means 29 (see FIG. 3). The mounting means 29 preferably includes an elongated screw 31 that replaces the standard screw in the hinge member 23, a sleeve member 33 that is positioned on the elongated screw 31 beneath the hinge member 23, and a nut 35 mounted on the elongated screw 31 beneath the sleeve member 33 for securing the sleeve member 33 to the hinge member 23. A washer 37 may be positioned between the nut 35 and the sleeve member 33. A downwardly directed arm member 39 is attached to the mounting means 29. The proximal end 41 of the arm member 39 is preferably fixedly attached to the sleeve member 33 of the mounting means 29 as by welding or the like. A wide support pad 43 is attached to the distal end 45 of the arm means 39 as by crimp means 47. The support pad 43 is preferably formed of a flexible, resilient plastic material.

With the first positioning member 13 and the identical second positioning member 15 mounted on the hinge members 23 of the spectacles 17, the pair of support pads 43 mounted on the pair of downwardly directed arm members 39 contact the wearer W of the spectacles 17 adjacent his malar-bones thereby positioning the frame front 19 of the spectacles 17 so that the bridge 27 of the frame cannot contact the nose and/or adjoining facial tissue of the wearer W of the spectacles. The arm members 39 are preferably adjusted to the wearer W of the spectacles so that the frame front 19 is positioned away from the nose and adjoining facial tissue of the wearer W of the spectacles and the lenses 25 are positioned so that his vision is not affected. The spectacles positioning apparatus 11 of the present invention is primarily for use by persons who wear some form of prescription spectacles 17 and undergo some form of nasal surgery or suffer some sort of facial injury and are, thus, unable to wear their spectacles in the normal manner until sufficient healing takes place. The spectacles positioning apparatus 11 provides low-cost adaptation of the standard spectacles 17 so that they can be worn until sufficient healing of such injuries or surgery takes place. The spectacles positioning apparatus 11 causes the wearer W of the spectacles no pain or irritation due to the fact that the wide support pads 43 are rigidly supported by the malar-bones where there is enough subcutaneous tissue to allow motion and comfort. When sufficient healing takes place, the spectacles positioning apparatus 11 may be removed from the spectacles 17 without damage thereto.

Although the invention has been described and illustrated with respect to a preferred embodiment thereof, it is not to be so limited since changes and modifications may be made therein which are within the full intended scope of the invention.

I claim:

1. For use with standard spectacles including a frame, a pair of temples, and a pair of hinge members pivotally connecting the frame to the temples, apparatus for positioning the spectacles so that no portion of the frame front contacts the wearer's nose and/or adjoining facial tissue, said apparatus comprising a pair of positioning members for respective attachment to the pair of hinge members, each positioning member comprising:

a. mounting means for attachment to one of the hinge members of the spectacles, said mounting means including an elongated screw replacing the standard screw in the hinge member, a sleeve member removably positioned on said elongated screw beneath the hinge member, a nut member mounted on said elongated screw beneath said sleeve member for securing said sleeve member to the hinge member, b. an arm member having proximal and distal ends, said proximal end being attached to said sleeve member, c. a flexible, resilient support pad attached to said distal end of said arm member for contacting the wearer adjacent one malar-bone.

\* \* \* \* \*